(12) United States Patent
Kim

(10) Patent No.: US 9,912,447 B2
(45) Date of Patent: Mar. 6, 2018

(54) METHOD AND APPARATUS FOR PROCESSING REVERSE TRANSMISSION RESOURCES IN A MOBILE COMMUNICATION SYSTEM

(75) Inventor: Soeng Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1055 days.

(21) Appl. No.: 13/318,216

(22) PCT Filed: Apr. 30, 2010

(86) PCT No.: PCT/KR2010/002733
§ 371 (c)(1),
(2), (4) Date: Oct. 31, 2011

(87) PCT Pub. No.: WO2010/126325
PCT Pub. Date: Nov. 4, 2010

(65) Prior Publication Data
US 2012/0044905 A1    Feb. 23, 2012

(30) Foreign Application Priority Data

Apr. 30, 2009  (KR) ........................ 10-2009-0038419

(51) Int. Cl.
*H04L 1/18* (2006.01)
*H04W 72/12* (2009.01)
*H04W 28/06* (2009.01)

(52) U.S. Cl.
CPC ....... *H04L 1/1854* (2013.01); *H04W 72/1268* (2013.01); *H04W 28/06* (2013.01)

(58) Field of Classification Search
CPC ..... H04L 1/1854; H04L 47/215; H04L 47/14; H04L 47/10; H04W 72/1268; H04W 72/1242; H04W 72/00
See application file for complete search history.

(56) References Cited

U.S. PATENT DOCUMENTS

| 2005/0249133 | A1  | 11/2005 | Terry et al. |
| 2008/0254804 | A1* | 10/2008 | Lohr et al. ................ 455/442 |
| 2009/0097444 | A1  | 4/2009  | Lohr et al. |
| 2009/0225711 | A1* | 9/2009  | Sammour et al. ........... 370/329 |

(Continued)

FOREIGN PATENT DOCUMENTS

| KR | 10-2006-0092883 A | 8/2006 |
| KR | 10-2008-0041237 A | 5/2008 |

(Continued)

OTHER PUBLICATIONS

3GPP TS 36.321 v8.5.0, Medium Access Control (MAC) protocol specification (Release 8) Mar. 2009

*Primary Examiner* — Jackie Zuniga Abad
(74) *Attorney, Agent, or Firm* — Jefferson IP Law, LLP

(57) ABSTRACT

The present invention relates to a method and apparatus for processing reverse transmission resources of a user terminal in a mobile communication system. When receiving a plurality of grants, the method and apparatus sum resources allocated by the grants, distribute the summed resources to logical channels, map the resources distributed by the logical channels and the logical channels to MAC PDUs according to the data sizes of the MAC PDUs, and allocate the resources distributed by the mapped logical channels.

14 Claims, 6 Drawing Sheets

(56) References Cited

U.S. PATENT DOCUMENTS

2009/0316637 A1* 12/2009 Yi .................... H04W 72/0413
370/329
2014/0043997 A1 2/2014 Anderson

FOREIGN PATENT DOCUMENTS

KR    10-2008-0071737 A    8/2008
KR    10-2009-0014937 A    2/2009

* cited by examiner

US 9,912,447 B2

METHOD AND APPARATUS FOR PROCESSING REVERSE TRANSMISSION RESOURCES IN A MOBILE COMMUNICATION SYSTEM

BACKGROUND OF THE INVENTION

1. Field of the Invention

The present invention relates to a method and apparatus for processing uplink transmission resource indicated when a terminal has received multiple uplink transmission resource allocation informations simultaneously in a mobile communication system.

2. Description of the Related Art

Mobile communication systems are developed to provide the subscribers with voice communication services on the move. With the rapid advance of technologies, the mobile communication systems have evolved to support high speed data communication services as well as the standard voice communication services.

Recently, as the next generation mobile communication system of the $3^{rd}$ Generation Partnership Project (3GPP), Long Term Evolution (LTE) is under development. The LTE system is a technology for realizing high-speed packet-based communication at about 100 Mbps, aiming at commercialization in around 2010. Regarding the commercialization of the LTE system, a discussion is being held on several schemes: one scheme for reducing the number of nodes located in a communication path by simplifying a configuration of the network, and another scheme for maximally approximating wireless protocols to wireless channels.

Unlike voice service, data service is characterized in that the resource is allocated according to the data amount to be transmitted and channel condition. Accordingly, in the wireless communication system such as cellular communication system, a scheduler manages resource allocation in consideration of the resource amount, channel condition, and data amount. This is also the case in the LTE system as one of the next generation mobile communication systems such that the scheduler located in the base station manages and allocates the radio resource.

A description is made of the uplink data transmission procedure hereinafter. A base station transmits a grant to the terminal based on the buffer state reported by the terminal to allocate uplink resource. The terminal assigns the resources allocated by means of the grant for individual logical channels and generates data in match with size of the resource assigned per logical channel. The generated data are multiplexed into MAC PDU by a MAC device such that the transceiver of the terminal transmits the MAC PDU on the assigned transmission resource. This uplink data transmission procedure is defined under the assumption that the terminal receives one grant at a time point. Since one MAC PDU is generated by one grant, the terminal procedure is also designed under the assumption that one MAC PDU is generated at a certain time point.

SUMMARY OF THE INVENTION

Problem to be Solved

As the LTE standard is evolving, discussions are being conducted on the techniques for a terminal to receive data on multiple downlinks and transmit data on multiple uplinks. However, there is no specified terminal procedure yet on how a terminal receives multiple grants simultaneously and generates and transmits multiple MAC PDUs.

Means for Solving the Problem

In accordance with an aspect of the present invention, a method for processing uplink transmission resource of a user terminal in a mobile communication system includes aggregating, when a plurality of grants are received, resources indicated in the grants, and dividing the aggregated resource among logical channels. Preferable mapping the logical channels to MAC PDUs to encapsulate data on the same logical channel in the same MAC PDU as far as possible in consideration of sizes of the resources assigned for the logical channels and the MAC PDUs, and assigning the divided resources for the mapped logical channels.

In accordance with still another aspect of the present invention, an apparatus for processing uplink transmission resource of a user terminal in a mobile communication system includes a recipient device which receives a plurality of grants and a resource allocator which aggregates, when the grants are received, resources indicated in the grants and divides the aggregated resource among logical channels. Preferably, the resource allocator maps the logical channels to MAC PDUs to encapsulate data on the same logical channel in the same MAC PDU as far as possible in consideration of sizes of the resources assigned for the logical channels and the MAC PDUs and assigns the divided resources for the mapped logical channels.

Advantageous Effects

The present invention allows a terminal received a plurality of grants simultaneously to generate higher layer data to be multiplexed into a plurality of MAC PDUs while minimizing overhead.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

The present invention proposes a method and apparatus for configuring data to be transmitted at a terminal based on a plurality of grants received simultaneously.

Figure 1:
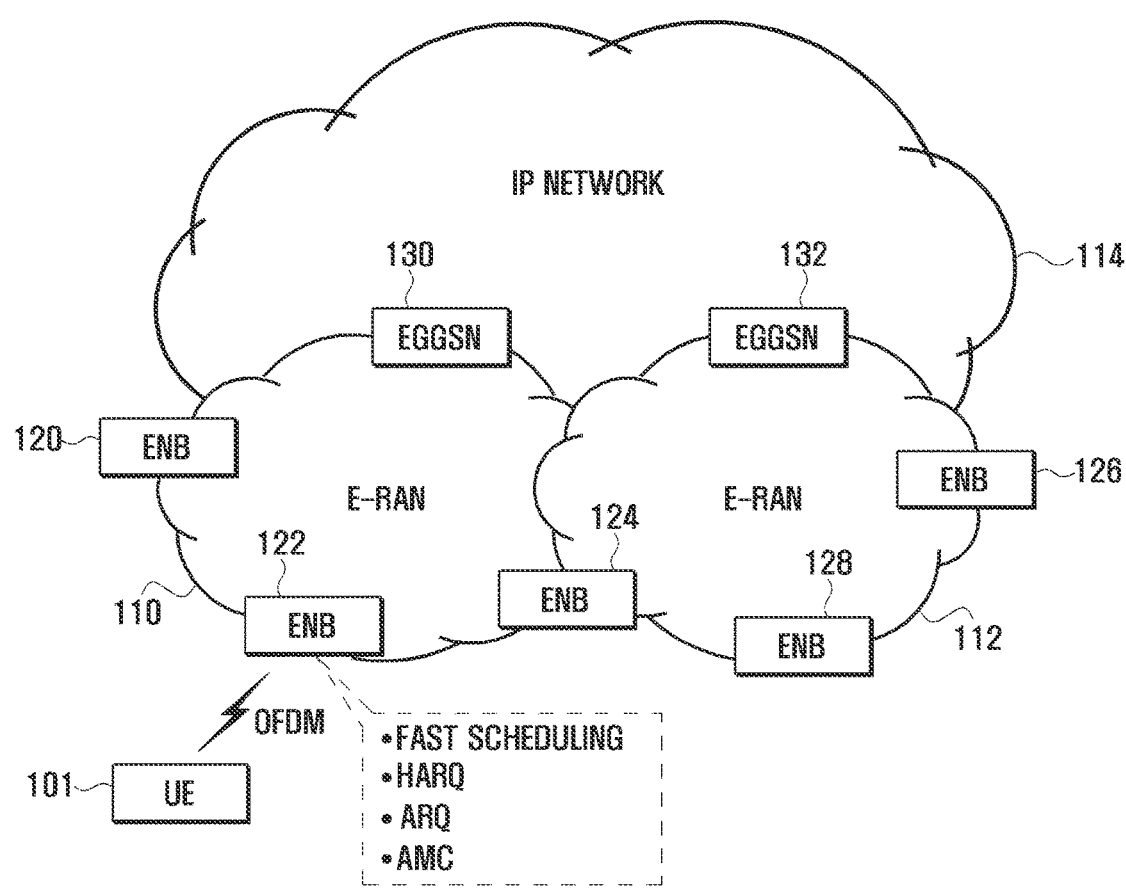
FIG. 1 is a diagram illustrating a configuration of an LTE mobile communication system.
Figure 2:
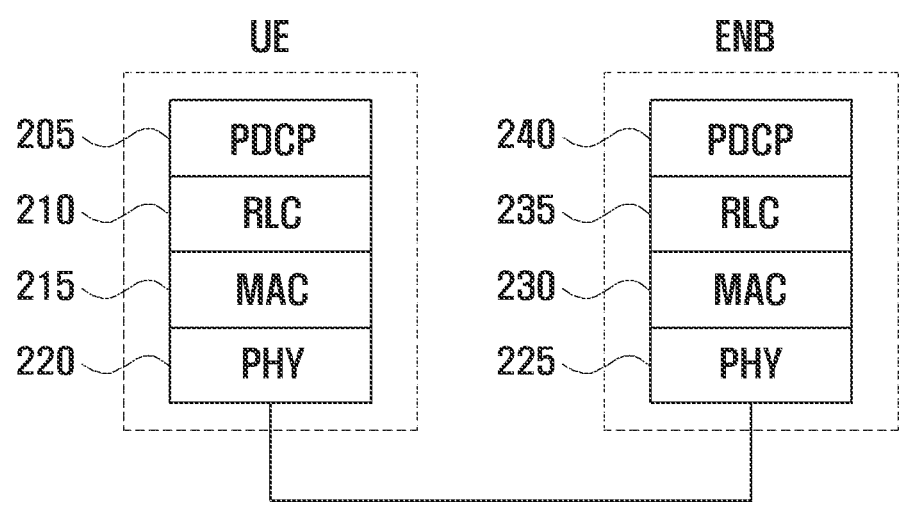
FIG. 2 is a diagram illustrating a protocol stack of an LTE mobile communication system.

Prior to explaining the present invention, a description is made on the LTE mobile communication system in detail with reference to FIGS. 1 and 2.

FIG. 1 is a diagram illustrating a configuration of an LTE mobile communication system.

Referring to FIG. 1, the LTE mobile communication system includes Evolved Radio Access Network (hereinafter, referred to as E-RAN) 110 and 112) is simplified in two-node structure of evolved Node B (hereinafter, referred to as eNB or Node B) 120, 122, 124, 126, and 128 and higher node (Access Gateway or enhance Gateway GPRS Support Node, hereinafter referred to as EGGSN) 130 and 132. The User Equipment (hereinafter, referred to as UE) 101 accesses Internet Protocol (IP) network 114 via E-RANs 110 and 112.

The eNBs 120 to 128 corresponds to legacy node B of UMTS system. The eNBs 120 to 128 are connected with the UE 101 via radio channel and responsible for more complex functions as compared to the legacy node B. Since all the user traffics including real time services such as Voice over IP (VoIP) are transmitted through shared channel, there is a need of a device for scheduling the based on the state information of the UEs 101, and the eNB is responsible for this function in LTE. Each of the eNBs 120 to 128 manages a plurality cells. In order to meet the requirements of maximum data rate of 100 Mbps, LTE adopts Orthogonal Frequency Division Multiplexing (OFDM) as radio access technology in maximum 20 MHz bandwidth. LTE also adopts Adaptive Modulation & Coding (AMC) for determining modulation scheme and channel coding rate depending on the channel condition of the UE 101.

FIG. 2 is a diagram illustrating a protocol stack of an LTE mobile communication system.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. In view of transmission, the data input to a protocol entity is referred to as Service Data unit (SDU), and the data output from the protocol entity is referred to as Protocol Data Unit (PDU).

The data requiring similar service quality are transmitted/received on a logical channel, and the logical channel corresponds to the PDCP devices 205 and 240 and RLC devices 210 and 235 configured to guarantee the service quality. Typically, one logical is configured for one service, and priority per logical channel is configured according to the required service quality of the service.

In the present invention, when a plurality of grants are received, the UE 101 aggregates the resources allocated for individual grants, divides the aggregated resource for the individual logical channels, maps the logical channels to the MAC PDUs according to the resources divided for the logical channels and data size of the MAC PDU, and assigns the divided resources for logical channels. The UE 101 also generates RLC PDUs corresponding to the resources assigned for the logical channels, multiplexes the RLC PDUs into MAC PDUs, and transmits the MAC PDUs on the assigned resource per grant. That is, when a plurality of grants are received from the eNBs 120 to 128 simultaneously, the UE 101 generates MAC PDUs in match with the sizes of resources allocated for individual grants and transmits the MAC PDUs on the uplink transmission resources indicated by the grants. The higher layer data, i.e. RLC PDUs, are multiplexed into the MAC PDUs. The present invention proposes a UE procedure and method for allocating resources indicated by a plurality of grants received simultaneously to corresponding logical channels, respectively.

Figure 3:
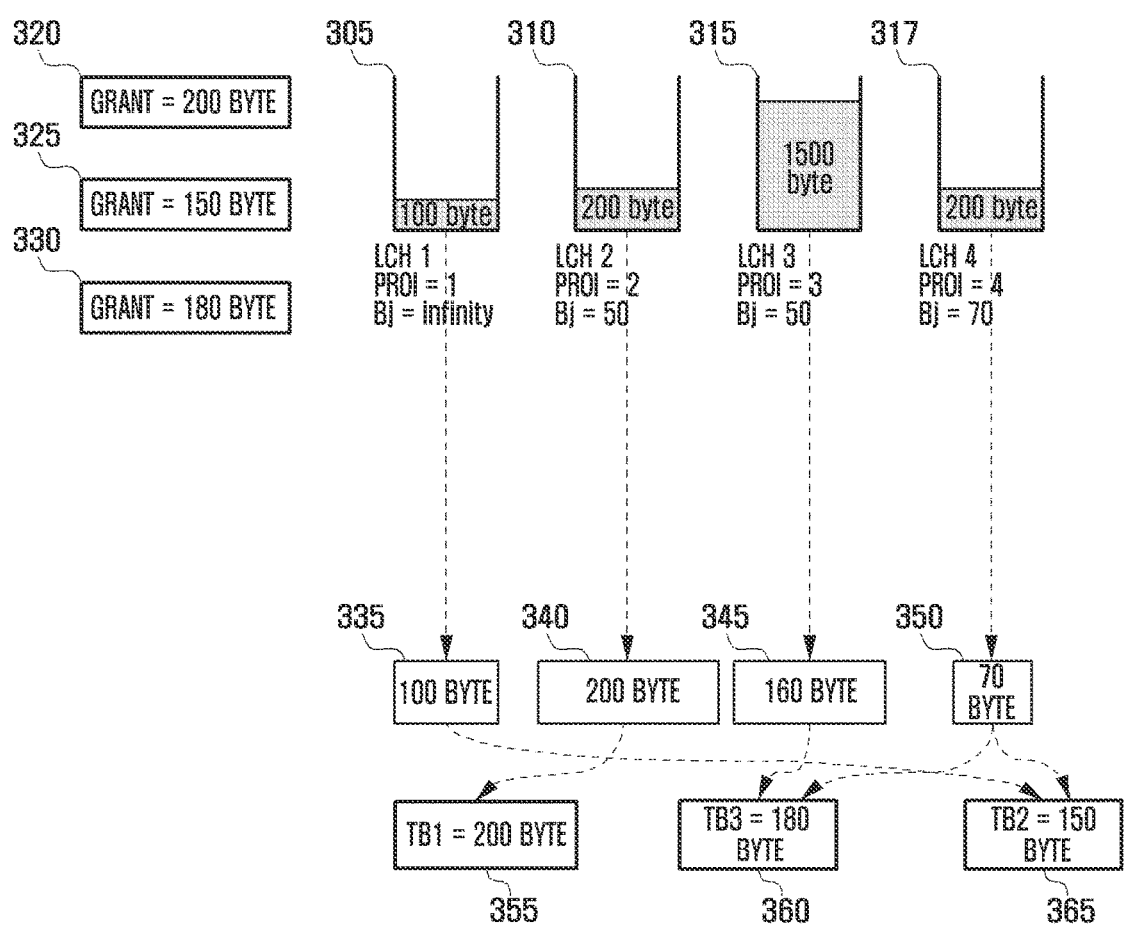
FIG. 3 is a diagram illustrating a procedure according to an embodiment of the present invention.

FIG. 3 is a diagram illustrating a procedure according to an embodiment of the present invention. In the following description, MAC header and RLC header are not taken into account for convenience purpose.

Referring to FIG. 3, the UE 101 is configured with 4 logical channels 305, 310, 315, and 317: logical channel 1 305 having 100 bytes of data, logical channel 2 310 having 200 bytes of data, logical channel 3 315 having 1500 bytes of data, and logical channel 4 317 having 200 bytes of data. The logical channel 1 305 is of priority 1, the logical channel 2 310 is of priority 2, the logical channel 3 315 is of priority 3, and the logical channel 4 317 is of priority 4; and the amount of tokens accumulated in the respective logical channels 305, 310, 315, and 317 are infinite for the logical channel 1 305, 50 bytes for the logical channel 2 310, 50 bytes for the logical channel 3 315, and 70 bytes for the logical channel 4 317. Here, the tokens are data to be transmitted preferentially in the logical channels 305, 310, 315, and 317 and can be configured for the respective logical channels 305, 310, 315, and 317. The UE 101 receives 3 grants, the first grant 320 assigning resource capable of transmitting MAC PDU of 200 bytes, the second grant 325 assigning resources capable of MAC PDU of 150 bytes, and the third grant 330 assigning resources capable of MAC PDU of 180 bytes.

If a single grant is received, the UE divides the resource assigned as indicated by the grant among the logical channels 305, 310, 315, and 317. If this is applied to the situation where multiple grants are received, the MAC PDU encapsulates the data originated from multiple channels, resulting in overhead. For example, the accumulated tokens should be assigned resource preferentially, the MAC PDU corresponding to the first grant 320 is occupied by 100 bytes of logical channel 1 305, 50 bytes of logical channel 2 310, an d50 bytes of logical channel 3 315. The MAC PDU corresponding to the second grant 325 is occupied by 70 bytes of logical channel 4 317 such that the tokens are assigned the resource completely, and the rest data are assigned the resource in priority order of the logical channels 305, 310, 315, and 317 such that the MAC PDU corresponding to the second grant 325 is occupied by 80 bytes of logical channel 2 310. The MAC PDU corresponding to the third grant 330 is occupied by the rest 70 byte of logical channel 2 310 and 110 bytes of logical channel 3 315.

In order to prevent each MAC PDU from carrying the data originated from different logical channels 305, 310, 315, and 317, the present invention proposes a method in which, when multiple grants are received simultaneously received, the UE aggregates the resources assigned in the multiple grants into a aggregated resource and then divides the aggregated resource among the logical channels. In the example of FIG. 3, the amount of the aggregated resource is total 530 bytes obtained by aggregating 200 bytes, 130 bytes, and 180 bytes such that the UE 101 divides the 530 bytes among the logical channels 305, 310, 315, and 317. The logical channel 1 305 is assigned 50 bytes, the logical channel 2 310 is assigned to 200 bytes (50 bytes for tokens and 150 bytes for other data), the logical channel 3 315 is assigned 160 bytes (50 bytes for tokens and 110 bytes for other data), and the logical channel 317 is assigned 70 bytes for tokens.

The UE 101 determines the amounts of the data of the logical channels 305, 310, 315, and 317 that are to be encapsulated in MAC PDUs in consideration of the resource amounts assigned for the logical channels 305, 310, 315, and 317 and sizes of the MAC PDUs to be generated. In order to prevent the data of a logical channel from being encapsulated in several MAC PDUs unnecessarily, the UE maps the data of the logical channels 305, 310, 315, and 315 to the MAC PDUs in descending order of PDU size. There can be several rules for determining logical channel to be mapped. For example, the UE 101 can map data of the logical channel assigned the greatest resource among the logical channels assigned the resource smaller than the largest MAC PDU 355 to the largest MAC PDU and repeats this for the next largest PDUs 360 and 365. That is, the UE 101 maps logical channels to the MAC PDUs 355, 360, and 365 in descending order of the sizes of data of the logical channels. The UE 101 also maps the logical channels 305, 310, 315, and 317 to the MAC PDUs 355, 360, and 365 in descending order of size of MAC PDUs. The UE 101 also maps the logical channels 305, 310, 315, and 317 in descending order of remained sizes of the MAC PDUs 355, 360, and 365.

For example, the largest MAC PDU 355 is 200 bytes and greater than any of the resources divided among the logical channels 305, 310, 315, and 317 such that the data 340 of the logical channel 2 310 assigned the largest resource is mapped to the MAC PDU 355. After mapping the data 340 of the logical channel 2 310, the remained space of the MAC PDU 355 becomes 0. The UE 101 selects the MAC PDU 360 largest in size with the remained space and determines the logical channel according to the same rule. As the logical channels assigned the resources smaller than the MAC PDU 360 in size among the logical channels 305, 310, 315, and 317, there are the logical channel 1 305, logical channel 3 315, and logical channel 4 317 of which the logical channel 1 305 is assigned the largest resource, such that the UE maps the data 345 of the logical channel 3 315 to the MAC PDU 360. At this time, the remained space of the MAC PDU 360 becomes 150 bytes. Afterward, the largest MAC PDU 365 is 150 bytes, and the logical channel 1 305 and logical channel 4 317 have the data smaller than 150 bytes and are not mapped to the MAC PDUs 355, 360, and 365 yet. The UE 101 maps the data 335 of the logical channel 1 350 assigned the largest resource to the MAC PDU 365. Afterward, the remained space of the MAC PDU 365 is 50 bytes.

After the mapping process, the UE 101 applies the same rule to the MAC PDU 365 having the largest remained space. Among the logical channels 305, 310, 315, and 317 of which data are not mapped to any MAC PDU, there is no logical channel assigned the resource smaller than 50 byte of the remained space of the MAC PDU 365, such that the UE 101 maps the logical channels assigned the resource closest to 50 bytes in size to the remained space of the MAC PDU 365. That is, the logical channel 4 317 is mapped to the remained space of MAC PDU 365 and, as a consequence, 50 bytes of the 70-byte resource assigned to the logical channel 4 317 is mapped to the remained space of the MAC PDU 365 such that 20-byte resource is remained in the logical channel 4 317. Afterward, the UE 101 applies the same rule to the MAC PDU 360 having the largest remained space. Since the logical channel 4 317 having the 20-byte resource which is closest to the 20-byte remained space of the MAC PDU 360, the UE 101 maps the 20 bytes of the logical channel to the remained space of the MAC PDU 360.

Through the above procedure, the UE 101 allocates one or more resources to the logical channels 305, 310, 315, and 317. The logical channels 305, 310, 315, and 317 generates RLC PDUs using the allocated resources and transfers the RLC PDUs to the MAC layer. At this time, the logical channels 305, 310, 315, and 317 give transmission chances to the PDUs to be retransmitted preferentially using the allocated resources and configures, if remained resource exists, the PDU to be initially transmitted in match with the remained resource size. If multiple resources are assigned to certain logical channel 305, 310, 315, and 317, the UE 101 gives the transmission chances of the RLC PDUs to be retransmitted in descending order of resource sizes. The reason why the largest resource is preferentially used for RLC PDU retransmission is to prevent the RLC PDU from being segmented because the RLC PDU greater than the allocated resource must be segmented. For example, if the logical channel 4 317 has a retransmission RLC PDU of 40 bytes, the UE 101 gives transmission chance of the 40-byte retransmission RLC PDU on the resource having the largest size, i.e. 50 bytes, among the assigned resources. Next, a new RLC PDU of 10 bytes in match with the remained resource size and another new RLC PDU of 20 bytes in match with another resource size are configured and then transferred to the MAC layer. The UE 101 transmits the MAC PDUs 355, 360, and 365 to the eNBs 120 to 128.

A description is made of the operations of the elements of the UE 101 according to the present invention hereinafter.

Figure 4:
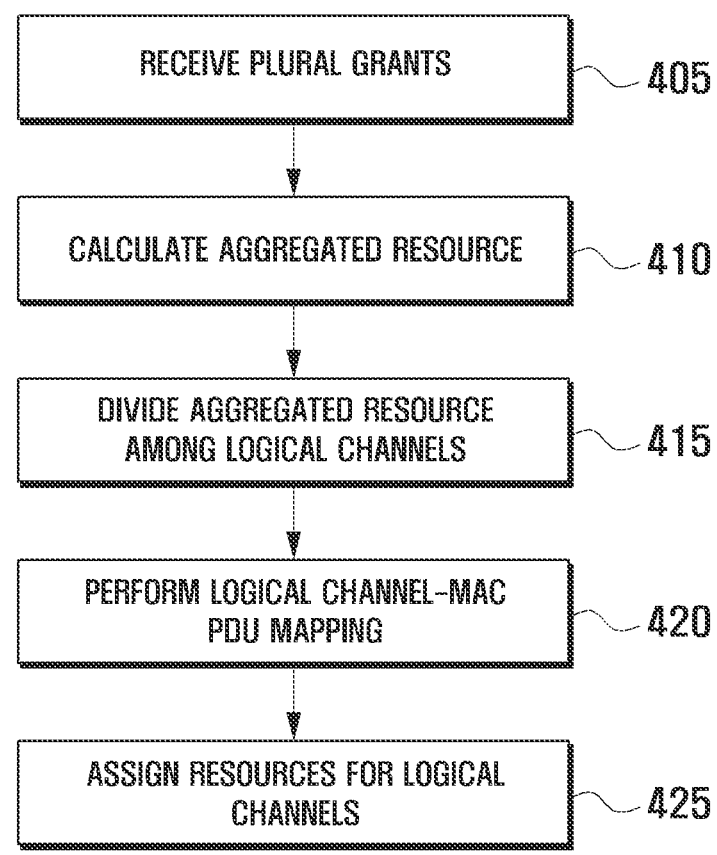
FIG. 4 is a flowchart illustrating operations of a MAC device.

FIG. 4 is a flowchart illustrating operations of a MAC device.

Referring to FIG. 4, if a plurality of grants for initial transmissions are received simultaneously (405), the MAC device 215 calculates amount of aggregated resource (410). The aggregated resource amount is the sum of the resources indicated in the grants. If x bytes of resource are allocated, this means that the amount of resources available for transmitting x bytes of MAC PDUs. If a grant is transmitted for initial transmission, this means that the grant is transmitted to allocate the resource for initial transmission of data other than HARQ retransmission.

Next, the MAC device 215 of the UE 101 divides the aggregated resource among the logical channels (415). At this time. The MAC device 215 divides the resources according to the priorities and tokens of the logical channels. Next, the MAC device 215 of the UE 101 performs logical channel-MAC PDU mapping (420). The logical channel-MAC PDU mapping is performed in consideration of the sizes of MAC PDUs and resource amounts divided among the logical channels to determine the mappings between the data generated in the logical channels and the MAC PDUs. It is preferred to define the logical channel-MAC PDU mapping such that the data generated in the same logical channel is encapsulated in the same MAC PDU. For example, the MAC device 215 of the UE 101 can perform the logical channel-MAC PDU mapping as follows. If a certain logical channel is mapped to a certain MAC PDU as much as x bytes, this means to match the data of the logical channel as much as x bytes with the MAC PDU.

[Example of Logical Channel-MAC PDU Mapping]

The MAC device 215 maps the logical channels to MAC PDUs in descending order of data sizes. The MAC device 215 also maps the logical channels to the MAC PDUs in descending order of sizes of MAC PDUs. The MAC device 215 also maps the logical channels to the MAC PDUs in descending order of remained spaces of the MAC PDUs. That is, the logical channel to which the largest portion of the resource is assigned among the logical channels of which assigned resource is equal to or less than the MAC PDU is mapped to the largest MAC PDU as much as the resource amount assigned to the logical channel. If there is no logical channel fulfilling this condition (that is, if the smallest resource assigned to the logical channels is greater than the largest MAC PDU), the logical channel assigned the resource closest to the largest PDU in size is mapped to the MAC PDU as much as the size of the MAC PDU. Afterward, the size of the MAC PDU is updated by reducing as much as mapped resource size, and the resource assigned to the logical channel is updated by reducing as much as the mapped resource. With the updated MAC PDU size and resource amounts assigned to the logical channels, the above describe process is repeated until all of the MAC PDU sizes and per-logical channel resource amounts are updated to 0.

In the above logical channel-MAC PDU mapping scheme, one or more resources match with a logical channel. The logical channel mapped to one MAC PDU is matched with one resource, and the logical channel mapped to multiple MAC PDUs is matched with the same number of resources as the MAC PDUs. The sizes of the resources are identical with the sizes of the resources matched with the logical channel in the mapped MAC PDU.

Next, the MAC device 215 of the UE 101 assigns the resource as much as the size of the resource matched per logical channel (425). At this time, a plurality of resources can be assigned for one logical channels. That is, the MAC device 215 multiplexes the RLC PDUs generated per logical channel into MAC PDUs and transmits the MAC PDUs using the resource indicated in the grant transmitted by the eNB 120 to 128.

Figure 5:
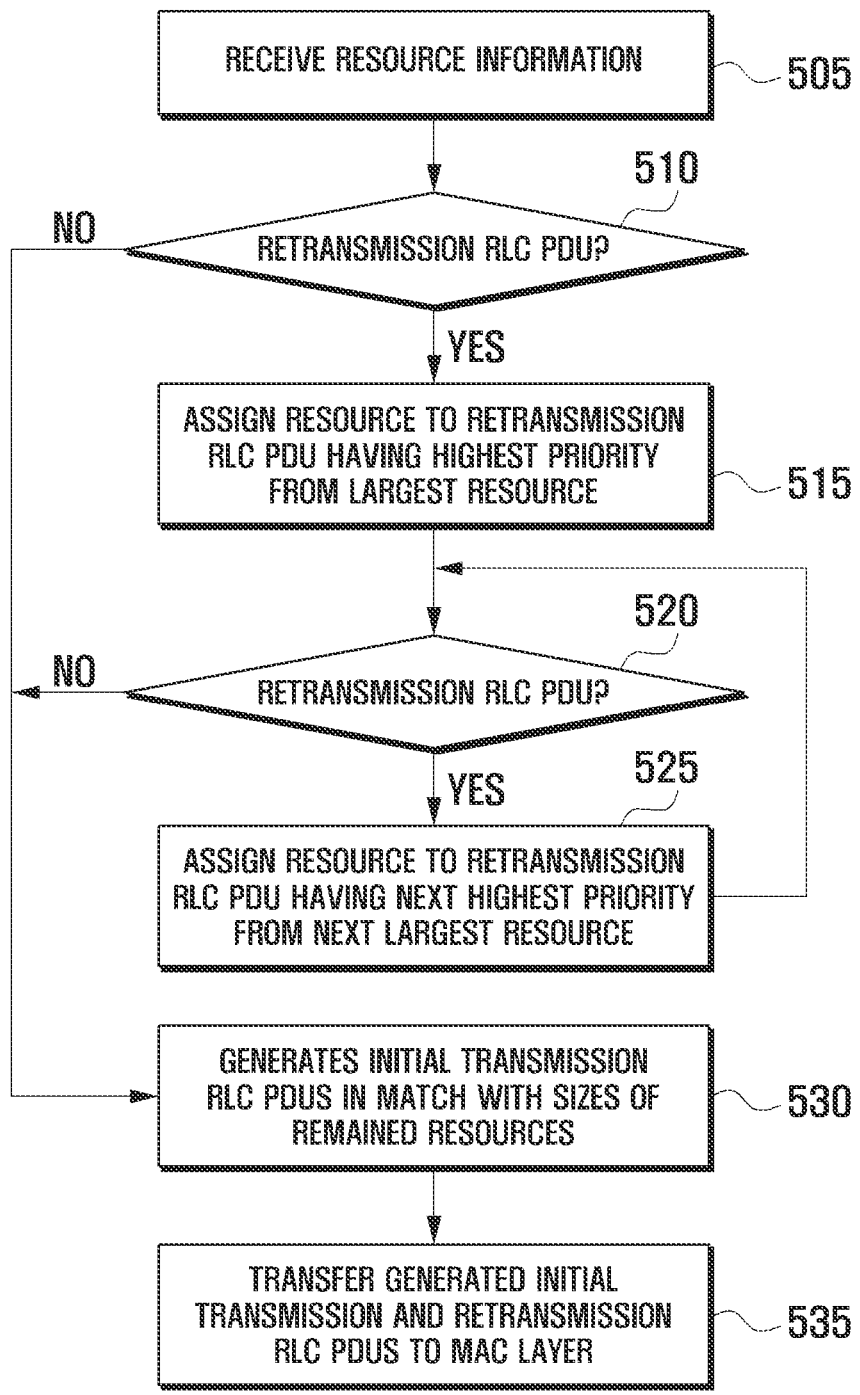
FIG. 5 is a flowchart illustrating operations of an RLC device received the resource size from MAC layer.

FIG. 5 is a flowchart illustrating operations of an RLC device received the resource size from MAC layer.

Referring to FIG. 5, the RLC device 210 is assigned resource from the MAC device 215 (505). The RLC device 210 can be assigned a plurality of resources and configure RLC PDUs to be transmitted to the MAC device 215 in match with the sizes of the resources. Next, the RLC device 210 determines whether a retransmission RLC PDU exists (510). Typically, the retransmission RLC PDUs have retransmission priorities determined in reverse order of sequence numbers. That is, the smaller the sequence number the sooner the retransmission PDU is transmitted.

If a retransmission RLC PDU exists at step 510, the RLC device 210 performs step 515. Since the size of the retransmission RLC PDU is fixed, if the size of the resource is less than that of the retransmission RLC PDU, the RLC device 210 segments the retransmission RLC PDU to fit to the resource size. It is preferred to avoid such a segmented retransmission because of the increase of overhead. In order to avoid the segmented retransmission of the RLC PDU as far as possible, the resource allocation for retransmission RLC PDU is performed in descending order of the sizes of plural resources. The resource size is updated by reducing as much as the amount allocated already and repeats resource allocation to the RLC PDU having the next highest retransmission priority. For example, if the RLC device 210 is assigned a 1000 bytes of resource and a 50 bytes of resource from the MAC device 215 and has the 300 byte-RLC PDU and 500-byte RLC PDU to be retransmitted, the 300-byte RLC PDU having retransmission priority higher than that of the 500-byte RLC PDU, the RLC device 210 assigns resources for the 300-byte retransmission RLC PDU in the 1000-byte resource largest in size and updates the size of the resource to 700 bytes.

Next, the RLC device 210 determines whether there is retransmission RLC PDUs to be transmitted (520). If there is retransmission RLC PDU to be transmitted, the RLC device 210 assigns resource to the retransmission RLC PDU having the next highest retransmission priority in the next largest resource (525). For example, since the next largest resource is the 700-byte resource remained after assigning 300 bytes from the 1000 byte-resource, the RLC device 210 assigns resource from the 500-byte retransmission RLC PDU in the 700-byte resource. Afterward, the RLC device 210 returns the procedure to step 520 to determine whether there is retransmission RLC PDU to be transmitted. If there is further retransmission RLC PDU to be transmitted, the RLC device 210 repeats step 520 to 525.

Finally, if there is no further retransmission RLC PDU at step 510 or 520, the RLC device 210 performs generates initial transmission RLC PDUs in match with the remained resources (530). For example, there are 200-byte resources remained after assigning 800 bytes from the 1000-byte resource for retransmission RLC PDU and the 50-byte resource which is remained without being assigned for retransmission RLC PDU. The RLC device 210 generates RLC PDUs of 200 bytes and 50 bytes for initial transmission. Afterward, the RLC device 210 transfers the retransmission RLC PDUs and initial transmission RLC PDUs to the MAC device 215 (535).

As described above, when there is retransmission RLC PDU to be transmitted, the RLC device 210 assigns resource for the retransmission RLC PDU in the largest resource to avoid segmentation of the retransmission RLC PDU. Another approach to prevent the retransmission RLC PDU from being segmented is to assign the resource closest to the resource in size among the resources larger than the retransmission RLC PDU. After updating the resource by reducing as much as assigned already, the RLC device 210 assigns the resource to the retransmission RLC PDU having the next highest priority in the same manner until all of the retransmission RLC PDUs are assigned corresponding resource or the remained resource amount becomes 0 and, if there is remained resource, generate new RLC PDUs to be transmitted initially with the remained resource.

For example, in a case where 100-byte, 200-byte, and 300-byte resources are allocated by the MAC device 215 while there are 150-byte, 250-byte, and 100-byte RLC PDUs to be retransmitted in sequential priority order, the RLC device 210 assigns transmission resource for the retransmission 105-byte RLC PDU having the highest priority from the 200-byte closest to the 150-byte RLC PDU in size among the resources larger than the corresponding PDU. Next, the RLC device 210 assigns transmission resource for the 250-byte retransmission RLC PDU having the next highest priority from the 300-byte resource closest to the 250-byte retransmission RLC PDU in size among the resources larger than the corresponding PDU. Likewise, the RLC device 210 assigns transmission resource for the 100-byte retransmission RLC PDU having the next highest priority from the 100-byte resource closest to the 100-byte retransmission RLC PDU in size among the resources larger than the corresponding PDU. As a result of this resource assignment, two 50-byte resources are remained such that the RLC device 210 configures initial transmission RLC PDUs in match with the size of remained resources.

Figure 6:
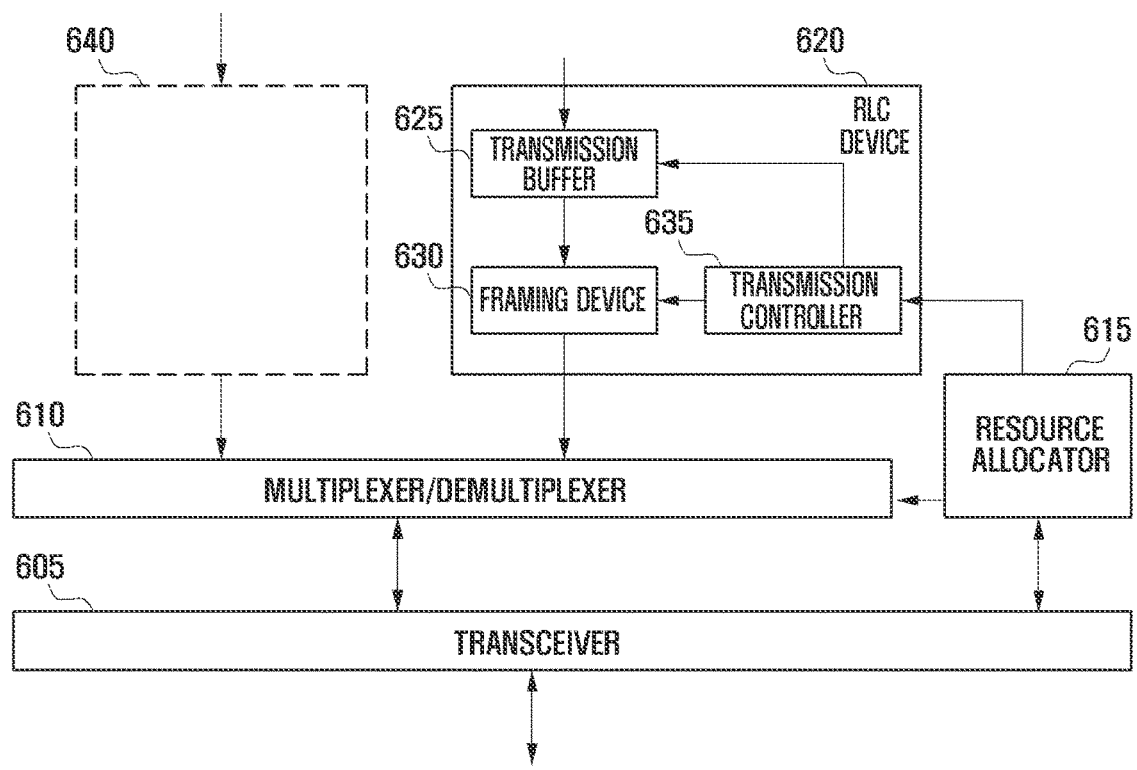
FIG. 6 is a diagram illustrating a configuration of the UE having an RLC device and a MAC device according to an embodiment of the present invention.

A description is made of the configuration of UE 101 hereinafter. FIG. 6 is a diagram illustrating a configuration of the UE having an RLC device and a MAC device according to an embodiment of the present invention.

Referring to FIG. 6, the MAC device 210 includes a multiplexer/demultiplexer 610 and a resource allocator 615 and connects to a transceiver 605. The transceiver 605 is the device for processing the signals transmitted and received through LTE radio channel, the transceiver 605 delivering MAC PDUs received on the radio channel to the multiplexer/demultiplexer 610 and providing grant information to the resource allocator 615. The multiplexer/demultiplexer 610 multiplexes the RLC PDUs from the RLC device 620 into a MAC PDU and sends the multiplexed MAC PDU to the transceiver 605 and demultiplexes the MAC PDU from the transceiver 605 into RLC PDUs and sends the demultiplexed RLC PDUs to the RLC device 620. The resource allocator 615 analyzes the grant received from the transceiver 605 to check the total amount of the allocated resources. In case that a plurality of grants are received, the resource allocator 615 calculates the total amount of the resource by aggregating the resources indicated in the individual grants, i.e. the aggregated resource. The resource allocator 615 divides the aggregated resource among the logical channels in consideration of the total amount of the resource, data amounts saved for the respective logical channels, priorities and accumulated tokens of the logical channels. The resource allocator 615 also determines the sizes of the resources to be assigned for logical channels by mapping the MAC PDUs to be generated by the grants and the logical channels. As aforementioned, when a logical channel is mapped to multiple MAC PDUs, multiple resources are assigned for the logical channels. The resource allocator 615 notifies a transmission controller 635 of the RLC device of the assigned resources.

The RLC device 620 includes a transmission buffer 625, a framing device 630, and a transmission controller 635. The transmission controller 635 assigns resource for RLC PDUs to be retransmitted in consideration of the resource size informed by the resource allocator 615 and generates initial transmission RLC PDUs to remained resources. The transmission buffer 625 buffers the data delivered from higher layers. The transmission buffer 625 also buffers the RLC PDUs to be retransmitted. The framing device 630 is the device for framing the higher layer data into RLC PDUs so as to segment or concatenate the higher layer data into appropriate sizes and attach a predetermined header. The framing device 630 also may re-segment the RLC PDUs to be retransmitted into appropriate sizes. By adding predetermined header information, the recipient device can recover the original RLC PDUs from the segmented RLC PDUs.

Although the description has been made with reference to particular embodiments, the present invention can be implemented with various modification without departing from the scope of the present invention. Thus, the present invention is not limited to the particular embodiments disclosed but will include the following claims and their equivalents.

What is claimed is:

1. A method of a terminal in a mobile communication system, comprising:
    determining, based on reception of a plurality of grants for a transmission time interval (TTI) from a base station, to transmit multiple media access control (MAC) protocol data units (PDUs) in the TTI;
    aggregating resources indicated in the plurality of grants, each of the grants including uplink scheduling information; and
    allocating the aggregated resources to at least one of logical channels in decreasing priority order based on information associated with each resource amount to be allocated preferentially to each of the logical channels.

2. The method of claim 1, further comprising:
    mapping the logical channels to the MAC PDUs based on resources allocated to each of the logical channels and sizes of the MAC PDUs.

3. The method of claim 2, wherein the mapping of the logical channels to the MAC PDUs comprises mapping the logical channels to the MAC PDUs in decreasing order of the sizes of the MAC PDUs.

4. The method of claim 3, wherein the mapping of the logical channels to the MAC PDUs comprises mapping the logical channels to the MAC PDUs in decreasing order of the resources allocated to each of the logical channels.

5. The method of claim 2, further comprising:
    configuring radio link control (RLC) PDUs according to the resources allocated to the logical channels.

6. The method of claim 5, further comprising:
    allocating retransmission RLC PDUs prior to new transmission RLC PDUs.

7. The method of claim 1, further comprising:
    allocating, if any resources remain, the remained resources to the at least one of the logical channels in decreasing priority order.

8. A terminal in a mobile communication system, comprising:
    a receiver configured to receive a plurality of grants from a base station; and
    a resource allocator configured to:
        determine, based on reception of a plurality of grants for a transmission time interval (TTI) from a base station, to transmit multiple media access control (MAC) protocol data units (PDUs) in the TTI,
        aggregate resources indicated in the plurality of grants, each of the grants including uplink scheduling information, and
        allocate the aggregated resources to at least one of logical channels in decreasing priority order based on first information associated with each resource amount to be allocated preferentially to each of the logical channel.

9. The terminal of claim 8, wherein the resource allocator is configured to map the logical channels to the MAC PDUs based on resources allocated to each of the logical channels and sizes of the MAC PDUs.

10. The terminal of claim 9, wherein the resource allocator is further configured to map the logical channels to the MAC PDUs in decreasing order of the sizes of the MAC PDUs.

11. The terminal of claim 10, wherein the resource allocator is further configured to map the logical channels to the MAC PDUs in decreasing order of the resources allocated to each of the logical channels.

12. The terminal of claim 9, further comprising:
    a radio link control (RLC) device configured to configure RLC PDUs according to the resources allocated to the logical channels.

13. The terminal of claim 12, wherein the RLC device is configured to allocate retransmission RLC PDUs prior to new transmission RLC PDUs.

14. The terminal of claim 8, wherein the resource allocator is configured to allocate, if any resources remained, the remained resources to the at least one of the logical channels in decreasing priority order.

* * * * *